(12) United States Patent
Studanski

(10) Patent No.: US 6,244,800 B1
(45) Date of Patent: Jun. 12, 2001

(54) HOLD-FAST TIE DOWN SYSTEM

(76) Inventor: Trevor R. Studanski, 4423B Clover La., Eagan, MN (US) 55122

( * ) Notice: Subject to any disclaimer, the term of this patent is extended or adjusted under 35 U.S.C. 154(b) by 0 days.

(21) Appl. No.: 09/404,611

(22) Filed: Sep. 23, 1999

(51) Int. Cl.⁷ ........................................ B60P 7/00
(52) U.S. Cl. ................................... 410/3; 248/500
(58) Field of Search ......................... 248/689, 690, 248/682, 680, 681, 500, 503; 410/3, 30

(56) References Cited

U.S. PATENT DOCUMENTS

| | | |
|---|---|---|
| 3,955,847 | 5/1976 | Schiowitz . |
| 4,671,713 | 6/1987 | Lenkman . |
| 5,044,845 | 9/1991 | Baker, Jr. . |
| 5,203,655 | 4/1993 | Persau . |
| 5,387,070 | 2/1995 | Roeling . |
| 5,553,882 | 9/1996 | Unruh . |
| 5,716,175 | 2/1998 | Fenske et al. . |
| 5,785,471 * | 7/1998 | Godbersen ................... 410/3 |
| 5,816,757 * | 10/1998 | Huston ....................... 410/3 |
| 5,902,081 * | 5/1999 | Zizzi ......................... 410/3 |
| 6,068,432 * | 5/2000 | Schifsky ..................... 410/3 |
| 6,099,218 * | 8/2000 | Ferrari ..................... 4120/3 X |

* cited by examiner

Primary Examiner—Ramon O. Ramirez
(74) Attorney, Agent, or Firm—Albert W. Watkins

(57) ABSTRACT

A clamp retains a snowmobile to a transport surface using a hook extending from the transport surface through a clamping bar to a pivoting handle. The handle is of the over-center type, and is pivoted through an arc to apply force between the clamping bar and the hook. A locking pin or lock prevents the handle from accidentally or undesirably being removed or loosening. A friction plate provides a low-cost and durable surface upon which the handle may travel while transmitting the clamping force. The hook is most preferably threaded or otherwise adjustable, to enable the clamp to be used with a wide variety of transport surfaces and snowmobiles. The pivoting handle is also readily removed from the transport surface, allowing the clamping bar to be removed without having to thread or remove the hook. In addition, only the hook remains exposed on the transport surface.

16 Claims, 4 Drawing Sheets

HOLD-FAST TIE DOWN SYSTEM

BACKGROUND OF THE INVENTION

1. FIELD OF INVENTION

The present invention pertains generally to vehicular transports, and more specifically to a clamping device for forcefully retaining a snowmobile ski to the transport surface.

2. DESCRIPTION OF THE RELATED ART

Snowmobiles provide a unique source of transportation and recreation over terrain that is often times otherwise impassible. Forward skis, an endless drive belt, and relatively high power-to-weight ratios enable the snowmobile to be driven through a wide variety of winter conditions. Nevertheless, it is often quite undesirable to use the snowmobile as the sole source of transport. For both recreational and racing purposes the snowmobile is generally be carried upon a trailer, flat bed truck or similar transport to some destination point along a roadway, and then the snowmobile is unloaded and driven from that point over the terrain. At some later time, when the racing or recreational event has been concluded, the snowmobile will once again be loaded upon the transport and carried again along a roadway.

Because the snowmobile will be loaded and unloaded frequently during a snowmobiling season, the particular method used to attach the snowmobile to the transport surface is of much consequence. As will be appreciated by those who are active snowmobilers, the weather can not be counted upon for providing a comfortable and convenient environment for attaching the snowmobile to transport. In the more northerly climates, where snowmobiles find much popularity, the weather may vary from above freezing, with or without freezing rain, sleet or snow, through temperatures that are fifty or more degrees Centigrade below zero. High winds and low visibility may further hamper efforts to attach the snowmobile.

When the transport is an open type carrier such as a trailer, the transport surface will be exposed to this range of elements not only during loading and unloading, but throughout the transport. The surface will further be sprayed or coated from water and snow thrown by the pulling vehicle or other vehicles during transport. Between challenging weather conditions and exposure of the transport surface to spray, mist and dirt from the roadway, only carefully designed methods of attachment will meet with success.

One successful attachment technique is illustrated by Persau in U.S. Pat. No. 5,203,655, incorporated herein by reference. A bar extends across the snowmobile skis, and is clamped down against the transport surface. The clamping force is obtained from a bolt passing through two nuts affixed to the trailer. By rotating the bolt using a crank handle, the bolt is threaded through the nuts in the usual way. The bar is pulled by the action of the bolt threads against the nuts towards the transport surface, which in this case is a trailer. A locking hole is provided through the bar which prevents the crank from being rotated, thereby preventing theft or accidental loss of the snowmobile. The Persau device offers a relatively simple and low cost apparatus which is fully removable from the transport surface. However, the Persau device also requires a significant amount of time to install and remove. Particularly when the weather is adverse and the loading person tired from a day's ride, this method of attachment is undesirable. Furthermore, the Persau bolt must be completely removed each time the snowmobile is removed from the trailer. Upon attachment to the trailer then the bolt must be re-inserted and threaded through the nuts. While this will generally not present a problem, when the weather is unfavorable the nut threads may be exposed to ice or snow that can be very difficult to clear from the relatively small opening within the nuts. Furthermore, the repeated removal and rethreading offers much opportunity for so-called cross-threading, where the bolt threads do not accurately align with nut threads, damaging both the nut and bolt. With either severe icing or damaged threads, the Persau device may be disabled completely, preventing the snowmobile from being transported without another means for attachment.

Baker, Jr. in U.S. Pat. No. 5,044,845 illustrates another method for attachment, also incorporated herein by reference for teachings relevant to the transport of snowmobiles. A rod is used by Baker to clamp the snowmobile skis against the transport surface, and the rod is pulled against the trailer surface by a pivoting arm. By pulling upwards on a handle, the clamping mechanism is pulled downwards towards the trailer surface, Limited resilience in the trailer and clamping components allows the handle in one embodiment to be elevated over a support and rested thereon. In another embodiment, a spring provides the necessary clamping force. While the Baker device eliminates the necessity for repeated threading, several disadvantages are introduced. First and foremost, the Baker device requires substantial alteration of the transport surface. Eight slots must be cut in the surface, and clearance provided on the underside of the surface for the pivot arms. Locking of the snowmobile is not illustrated, nor is the use of the illustrated spring a reliable method of attachment which can be counted upon through time and environment. Finally, with salt and mud sprayed up from roadways, and ice and snow packing issues as well, the pivoting arm underneath the trailer will become coated relatively quickly and will therefore be prone to seizing. Fenske et al in U.S. Pat. No. 5,716,175 incorporated herein by reference illustrate a removable clamp and bar structure that requires a relatively simple ninety degree rotation at the time of placement, and then limited turning of a handle to clamp the bar down tightly. While the Fenske et al device is much improved over the prior art devices, this clamp is relatively more expensive, and still requires rotation of the clamping bolt at the time of installation, and so is subjected to the adverse affects of dirt and ice upon the relatively small threads. Furthermore, a somewhat larger slot must be provided in the trailer, and the initial tightening can be somewhat difficult, since the clamp must be held against rotation while the handle is turned. requiring a relatively coordinated two-handed installation. While this may at first appear to be of little consequence, during extreme conditions and at the end of a day's ride, seemingly simple tasks are considerably more difficult than otherwise.

SUMMARY OF THE INVENTION

In a first manifestation, the invention is a clamp for applying a force between a snowmobile clamping bar and a substantially planar transport surface. A fastener engages the transport surface, and a handle pivotally fastened about a pivot point to the fastener has a contact surface applying a force to the clamping bar. In a first position the contact surface is spaced from transport surface by a first distance. In a second position the contact surface is spaced from transport surface by a second distance smaller than the first distance, after rotation of the handle about the pivot point in a first rotary direction. In a third position the contact surface is spaced by a third distance farther from the transport surface than it was in the second position. The force increases upon rotation from first position to second position and then decreases after further rotation to third position. As a result, the clamp and clamping bar press a snowmobile ski into tight frictional engagement with the transport surface in the third position.

In a second manifestation, the invention is a means for applying a clamping force against a snowmobile ski, thereby forcing the ski into rigid frictional engagement with a transport surface. A means is provided for anchoring to the transport surface. Another means generates clamping force by progressively increasing the clamping force and subsequently decreasing the force during a single continuous movement. An additional means transmits the clamping force from generating means to snowmobile ski, whereby an over-center effect is generated within the means for applying a clamping force which resists release of the clamping force.

In a third manifestation, the invention is a method for rigidly and removably attaching a snowmobile to a transport, comprising the steps of: cutting and bending a handle from sheet metal stock to provide a camming surface; threading a hook fastener into the transport; positioning the snowmobile upon the transport; passing the hook fastener through a hole formed in a clamping bar; engaging the hook fastener with a handle; and rotating the handle relative to hook fastener through a first arc, wherein the camming surface presses against clamping bar, thereby developing a force for clamping snowmobile to transport.

OBJECTS OF THE INVENTION

A first object of the invention is the provision of a totally reliable method of attachment which will ensure the snowmobile remains with the transport surface at all times during use of the attachment. A second object of the invention is to minimize the time and coordination needed to engage the attachment. A further object of the invention is to provide a ready mechanism for locking the attachment, to deter theft or other undesired removal of the snowmobile from transport surface. Another object of the invention is to limit the amount of alteration required of the transport and transport surface to accommodate the attachment. Yet a further object of the invention is to limit exposure of the attachment at the transport surface, to reduce the possibility of a snowmobile being driven into or over the attachment. An additional object of the invention is to provide substantial adjustability so that the attachment can accommodate widely varying snowmobiles and transports. A further object of the invention is the provision of a simple, low cost and durable attachment that will provide the requisite functionality regardless of weather or exposure to the elements or road spray. These and other objects are achieved in the present invention.

DESCRIPTION OF THE PREFERRED EMBODIMENT

Figure 1:
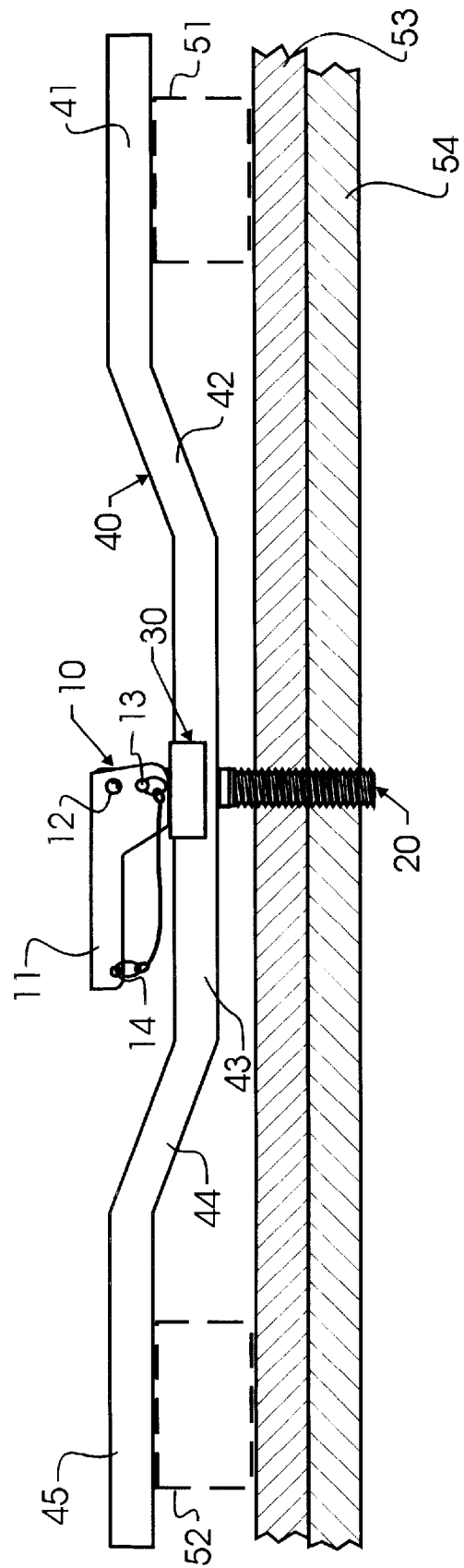
FIG. 1 illustrates the preferred embodiment clamp from a side view, with the transport surface and snowmobile skis cut away.

The preferred embodiment clamp 10 is illustrated during use in FIG. 1, clamping down snowmobile skis 51 and 52 to a transport surface 53, which might, for example, be a flat, relatively planar trailer bed. A clamping bar 40 is illustrated which, in the most preferred embodiment, has a gull-wing configuration with a relatively low center section 43, two vertically tapering portions 42 and 44, and two elevated portions 41 and 45. Extending through transport surface 53 into a reinforcing beam 54 is a threaded hook 20. Though not illustrated, threaded hook 20 may fasten through various nuts or threaded sleeves as are known in the art incorporated hereinabove, or, alternatively, reinforcing beam 54 or transport surface 53 may be threaded. While other types of fastening are generally known that may be employed as alternatives to threading, hook 20 in the most preferred embodiment is threaded since there are numerous pre-existing trailer installations that already have threaded components, such as threaded nuts, which hook 20 may be mounted into. In these pre-existing trailers, hook 20 may be mounted without any modifications to the trailer at all. Hook 20 passes not only through transport surface 53 and reinforcing beam 54, but also through a hole in clamping bar 40 and a similar hole in friction plate 30. At a top surface of friction plate 30 is a handle 11 having a pivot pin 12 and hole 13 therein. In the present illustration, reinforcing beam 54 is shown parallel to clamping bar 40, but this is not consequential to the invention. Reinforcing beams are found in different locations and configurations in common trailers, but for strength and integrity it is preferable to mount hook 20 through one of these beams. Where transport surface 53 is sufficiently strong, this is not a requirement.

While clamping bar 40 may take on other geometries which may offer other advantage, in the most preferred embodiment clamping bar 40 has the gull wing configuration illustrated. In addition, as shown in FIG. 1, lower portion 43 of clamping bar 40 will most preferably maintain a small gap from transport surface 53. By using the gull-wing configuration illustrated for clamping bar 40, it is possible to keep hook 20 shorter than if clamping bar 40 were a straight bar. The small gap allows flexure in clamping bar 40, the benefit which will be described in greater detail hereinbelow.

Figure 2:
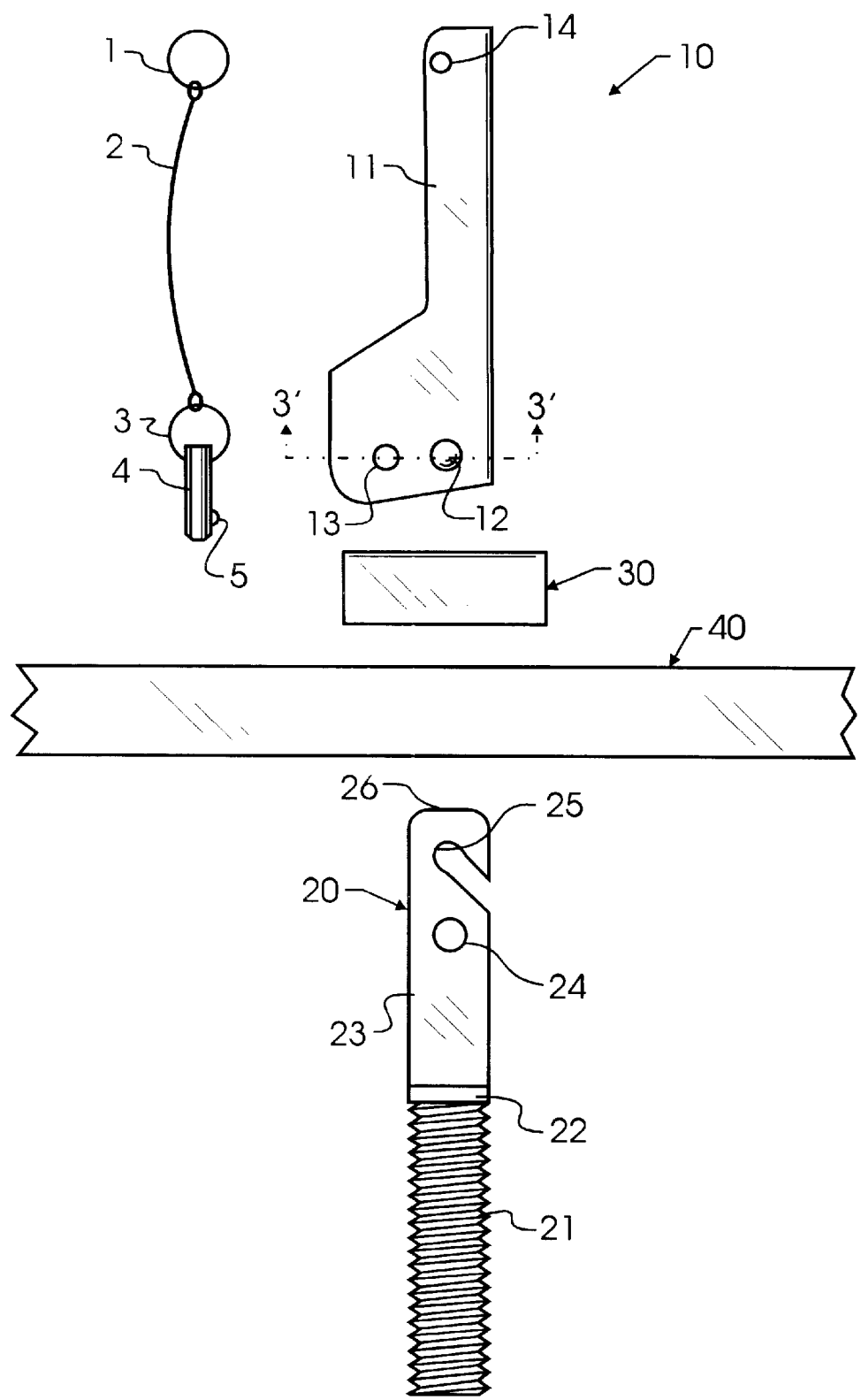
FIG. 2 illustrates the preferred embodiment clamp and bar by exploded view to better illustrate each individual component in relation to the others.

FIG. 2 illustrates the preferred embodiment clamp 10 from an exploded assembly view to better illustrate each of the components. Handle 11 includes two holes 13 and 14. Hole 14 will preferably only pass through one side of handle 11, and simply provides an attachment site for ring 1, which might, for example, be of the key-ring type which may be rotated onto handle 11 through hole 14. Other suitable rings or fasteners would be suitable, the exact nature of which is not critical to the invention. Extending from ring 1 is a lanyard 2 which, for weathering performance will most preferably be fabricated from a temperature resistant polymer which is capable of flexing even at the sub-zero temperatures encountered during the winter season. Nylon or other suitable material may be satisfactory, though polymers, natural materials such as leather or rope, or even metal cord would be suitable. At an end of lanyard 2 opposite ring 1 is a second ring 3 which has been threaded through a pin 4 having a spring-loaded ball 5. Hole 13, as shown in the exploded assembly view of FIG. 2, does not align with hole 24 of hook 20. This is a first unclamped position. When handle 11 is slipped onto hook 20, which is accomplished by sliding pin 12 into opening 25, and then handle 11 is rotated in a counter-clockwise fashion through a second position to a third position illustrated in FIG. 2, hole 13 will align with hole 24. In this third position, which is the clamping position, pin 4 may be inserted therethrough to ensure the clamping remains, regardless of bumps that may be encountered during transport. While rings 1 and 3, lanyard 2 and pin 4 are illustrated and most preferred, those of ordinary skill in the art will recognize that, for example, a key or combination lock may be substituted for pin 4, in which case the lock will act a s a theft deterrent by preventing the ready removal of handle 11 and bar 40 from the clamping position.

Figure 3:
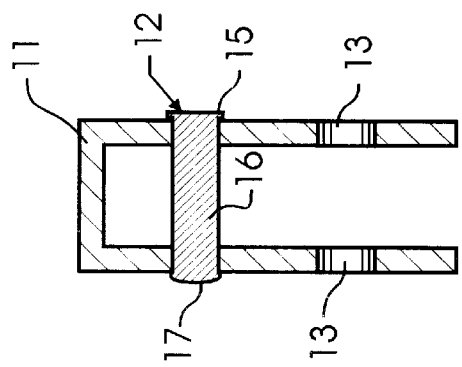
FIG. 3 illustrates the handle of FIG. 2 by a cross-section view taken along line 3'.

FIG. 3 illustrates handle 11 from a cross-section view taken along line 3' of FIG. 2. As can be seen from this viewing angle, handle 11 is most preferably formed from a sheet material which has been folded into a generally unshaped cross-section. The materials of choice for the present invention are primarily stainless steel for corrosion resistance and strength, though other materials may be selected which perform a like function. From one exterior surface of handle 11 to the other is pin 12, which most preferably has an enlarged or swaged portion 15 on one end and a second enlarged end, such as a round head 17, on the other surface.

Figure 4:
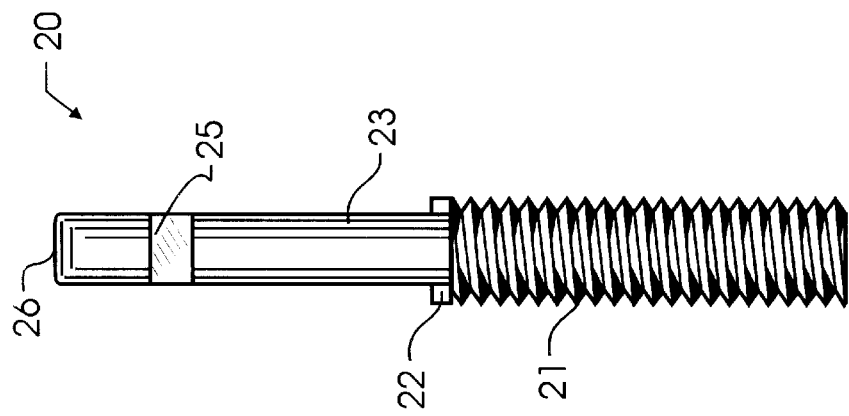
FIG. 4 illustrates the bolt of FIG. 2 form a side view.

Hook 20 is shown from a side view in FIG. 4, which is complementary to the viewing angle of handle 11 in FIG. 3 so that the engagement of the two parts is more evident. As can be seen best in FIG. 4, hook 20 includes a threaded base 21, a small, optional shoulder portion 22, and a generally rectangular shaft 23 extending vertically from shoulder 22. Opening 25 is designed to allow, at the time of placement of handle 25 onto hook 20, a central portion 16 of pin 12 to pass therethrough, thereby forming a pivot between central portion 16 and opening 25.

Figure 5:
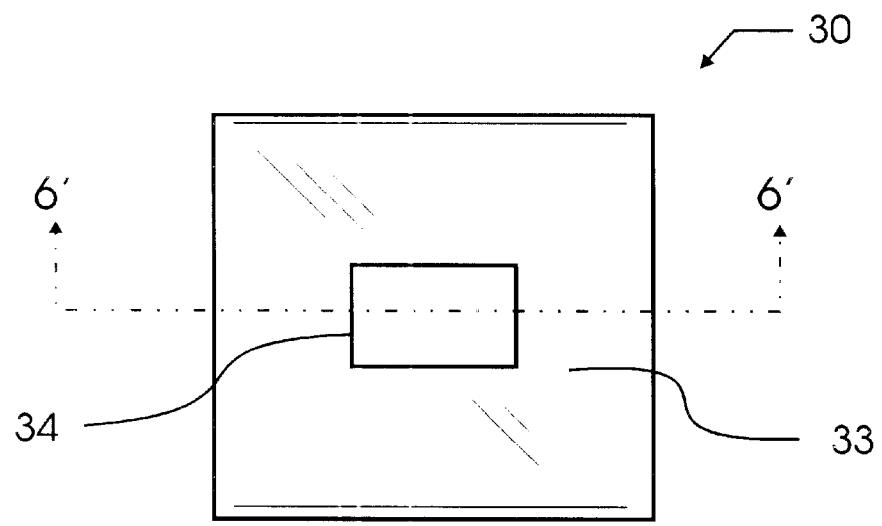
FIG. 5 illustrates the force plate of FIG. 2 from a top view.
Figure 6:
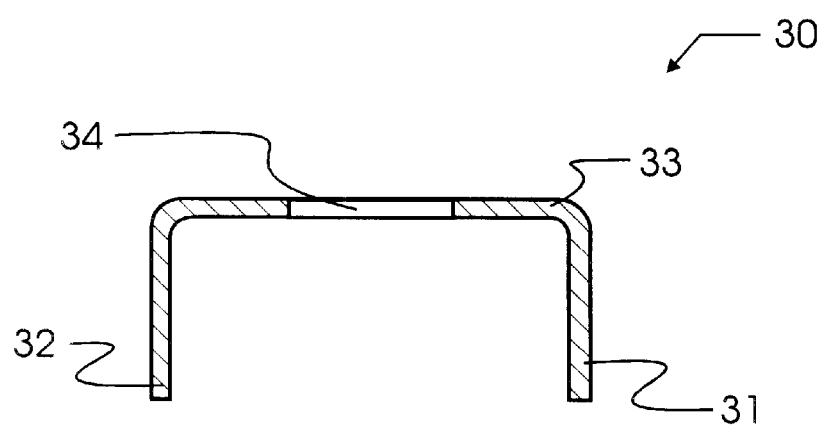
FIG. 6 illustrates the force plate from a cross-section taken along line 6' of FIG. 5.

While not essential to the operation of the invention, FIGS. 5 and 6 illustrate a friction plate 30. During rotation of handle 11, a relatively large amount of force may be generated between the contact points of handle 11 and clamping bar 40. Unfortunately, many of the clamping bars presently in use, for which the present invention is contemplated to co-operate with, are manufactured from aluminum alloys. These aluminum alloys will generally not perform well under the high force combined with sliding motion that is present during rotation of handle 11, so friction plate 30 has been provided to act as the wear surface, thereby protecting the integrity of clamping bar 40. To facilitate installation and use of friction plate 30, a rectangular slot 34 is formed in a top surface 33 which is slightly larger but similar in shape to the cross-sectional geometry of shaft 23. As can be seen in FIG. 6, friction plate 30 may further have two side members 31 and 32, thereby partially encompassing clamping bar 40 about three sides. In the most preferred embodiment, friction plate 30 will be adhesively attached to clamping bar 40, and so will not be lost or misplaced when not in use.

At the time of initial installation, hook 20 will be threaded into transport surface 53 as discussed hereinabove. Plate 30 will be adhesively mounted to clamping bar 40, and, if necessary, a hole will be provided through bar 40 which will permit hook 20 to pass through. This completes the requisite installation, though hook 20 may need to be adjusted up or down depending upon the particular snowmobile and clamping bar. In the preferred embodiment, the adjustment is achieved simply by threading hook 20 further into or out of transport surface 53. Next, snowmobile skis 51 and 52 will be positioned upon transport surface 53, and clamping bar 40 placed to allow hook 20 to pass therethrough and protrude above plate 30. Note that, owing to the removable nature of handle 11, clamping bar 40 may be placed and removed without requiring any change, adjustment or threading of hook 20. Handle 11 is then slipped onto hook 20 by holding handle 11 coaxial to hook 20, as shown in FIG. 2, and pin 12 passed through opening 25. Then handle 25 will be rotated from coaxial to hook 25 to a position transverse, as shown in FIG. 1, which is the final clamping position. The relatively short travel through a ninety degree arc and finishing in a horizontal position have been found to be highly advantageous for generating the requisite force readily. Other angles do not have the same advantage.

Due to the geometry of handle 11, including the relatively right angle adjacent hole 13, clamp 10 will exert a minimum force when coaxial as shown in FIG. 2, a maximum when at an approximately forty-five degree angle so that the point of contact is most nearly adjacent hole 13, and then progress to a lesser force as handle 11 is further rotated to a position perpendicular to the longitudinal axis of hook 20. This over-center effect ensures that handle 11 will stay in the locked position, even without the use of pin 4 or an alternative lock. Nevertheless, for the sake of safety, pin 4, a lock, or other equivalent structure should always be used. The gap between bar 40 and transport surface 53 facilitates the rotation of handle 11, by allowing the necessary flexure within bar 40 to allow handle 11 to go over-center.

While the foregoing details what is felt to be the preferred embodiment of the invention, no material limitations to the scope of the claimed invention are intended. Further, features, design alternatives and materials that would be obvious to one of ordinary skill in the art are considered to be incorporated herein. The scope of the invention is set forth and particularly described in the claims hereinbelow.

I claim:

1. A clamp for applying a force between a snowmobile clamping bar and a substantially planar transport surface, comprising:

a fastener for engaging said transport surface;

a handle pivotally fastened about a pivot point to said fastener and having a contact surface applying a force to said clamping bar which in a first position is spaced from said transport surface by a first distance and which in a second position is spaced from said transport surface by a second distance smaller than said first distance after rotation of said handle about said pivot point in a first rotary direction and which in a third position is spaced by a third distance farther from said transport surface than said second distance after further rotation of said handle in said first rotary direction;

wherein said force increases during rotation from said first position to said second position in said first rotary direction and which decreases during said further rotation to said third position;

whereby said clamp and said clamping bar press a snowmobile ski into tight frictional engagement with said transport surface in said third position; and further comprising a friction plate adjacent said clamping bar and opposite said clamping bar from said transport surface.

2. The clamp of claim 1 further comprising a slotted opening through said friction plate, through which said fastener may pass.

3. A clamp for applying a force between a snowmobile clamping bar and a substantially planar transport surface, comprising:

a fastener for engaging said transport surface, to operatively prevent motion of said fastener normal to said transport surface upon application of a normal force to said fastener, said fastener being adjustable relative to said transport surface to protrude into or extend therefrom by a variable amount;

a handle pivotally fastened about a pivot point to said fastener and having a contact surface applying a force to said clamping bar which in a first position is spaced from said transport surface by a first distance and which in a second position is spaced from said transport surface by a second distance smaller than said first distance after rotation of said handle about said pivot point in a first rotary direction and which in a third position is spaced by a third distance farther from said transport surface than said second distance after further rotation of said handle in said first rotary direction;

wherein said force increases during rotation from said first position to said second position in said first rotary direction and which decreases during said further rotation to said third position;

whereby said clamp and said clamping bar press a snowmobile ski into tight frictional engagement with said transport surface in said third position.

4. The clamp of claim 3 further comprising a threaded receiver within said transport surface, into which said fastener is threaded.

5. The clamp of claim 3 wherein said fastener further comprises a slotted opening therein, through which said handle may pass.

6. The clamp of claim 5 wherein said handle further comprises a generally u-shaped cross-section which is bridged by a pin, wherein said pin may be inserted through said slotted opening in said fastener, whereby said handle is attachable to said fastener and removable therefrom by sliding said pin into and out of said slotted opening.

7. A means for applying a clamping force against a snowmobile ski, thereby forcing said ski into rigid frictional engagement with a transport surface, comprising:

a means for anchoring to said transport surface when a second force equal and opposite to said clamping force is applied to said anchoring means;

a means for generating said clamping force by progressively increasing said clamping force and subsequently decreasing said force during a single continuous movement of said generating means from a first position to a second position;

means for transmitting said clamping force from said generating means to said snowmobile ski through a snowmobile engaging means; and means for protecting and reinforcing said snowmobile engaging means;

whereby an over-center effect is generated within said means for applying a clamping force which resists release of said clamping force.

8. The forcing means of claim 7 wherein said means for generating said clamping force further comprises a handle which is rotated through a ninety degree arc to generate said clamping force.

9. The forcing means of claim 8 wherein in a first position said handle extends normal to said transport surface and which, subsequent to said ninety degree arc rotation is parallel to said transport surface.

10. The forcing means of claim 8 wherein said handle is machined from flat stock and formed into a u-shape cross-section.

11. The forcing means of claim 10 further comprising a contact edge through which said clamping force is transmitted to said snowmobile ski, said contact edge formed from an angular edge of said handle.

12. The forcing means of claim 8 wherein said means for generating said clamping force is manually removable through a single motion from said anchoring means.

13. A method for rigidly and removably attaching a snowmobile to a transport, comprising the steps of:

forming a handle to provide a camming surface;

threading a hook fastener into said transport;

positioning said snowmobile upon said transport;

passing said hook fastener through a hole formed in a clamping bar;

engaging said hook fastener with a handle; and rotating said handle relative to said hook fastener through a first arc, wherein said camming surface presses against said clamping bar, thereby developing a force for clamping said snowmobile to said transport.

14. The method for rigidly and removably attaching a snowmobile of claim 13 further comprising the step of rotating said handle from a position parallel to said hook fastener to a position perpendicular to said hook fastener.

15. The method for rigidly and removably attaching a snowmobile of claim 13, further comprising the step of sliding said handle into a slot in said hook fastener during said engaging step.

16. The method for rigidly and removably attaching a snowmobile of claim 13, wherein said forming step further comprises cutting and bending said handle from sheet metal stock.

* * * * *